(12) United States Patent
Wobben

(10) Patent No.: US 8,037,646 B2
(45) Date of Patent: Oct. 18, 2011

(54) METHOD FOR ERECTING A TOWER

(76) Inventor: Aloys Wobben, Aurich (DE)

( * ) Notice: Subject to any disclaimer, the term of this patent is extended or adjusted under 35 U.S.C. 154(b) by 868 days.

(21) Appl. No.: 11/547,117

(22) PCT Filed: Apr. 4, 2005

(86) PCT No.: PCT/EP2005/003498
§ 371 (c)(1), (2), (4) Date: Oct. 2, 2007

(87) PCT Pub. No.: WO2005/095717
PCT Pub. Date: Oct. 13, 2005

(65) Prior Publication Data
US 2008/0155907 A1    Jul. 3, 2008

(30) Foreign Application Priority Data

Apr. 2, 2004 (DE) .......... 10 2004 017 008

(51) Int. Cl.
E02D 27/42 (2006.01)
E02D 23/00 (2006.01)

(52) U.S. Cl. .......... 52/126.3; 52/40; 52/296; 52/742.14; 52/742.16; 405/243; 416/DIG. 6

(58) Field of Classification Search .......... 52/297, 52/296, 40, 170, 742.14, 742.15, 745.17, 52/745.14, 126.1, 126.3, 745.04, 742.16; 416/DIG. 6; 405/228, 233, 243, 224, 244; 343/875; 174/45 R; E02D 27/42, 23/08, E02D 27/12, 27/00

See application file for complete search history.

(56) References Cited

U.S. PATENT DOCUMENTS

| 962,699 | A | * | 6/1910 | Conzelman | 52/283 |
| 1,506,173 | A | * | 8/1924 | Hagen et al. | 264/254 |
| 3,645,057 | A | * | 2/1972 | Kaplan | 52/295 |
| 3,713,262 | A | * | 1/1973 | Jatcko | 52/98 |
| 3,829,540 | A | | 8/1974 | Cox | 264/34 |
| 3,834,094 | A | | 9/1974 | Ferguson | |
| 4,327,703 | A | * | 5/1982 | Destree | 125/1 |
| 4,331,314 | A | | 5/1982 | Chacour et al. | 248/679 |
| 4,365,929 | A | * | 12/1982 | Retz | 415/53.1 |
| 4,785,593 | A | | 11/1988 | Munoz, Jr. | |
| 4,887,691 | A | * | 12/1989 | Rotondo | 181/210 |
| 5,110,082 | A | | 5/1992 | Rowan, Jr. | 248/678 |
| 5,249,401 | A | * | 10/1993 | Schmid | 52/503 |
| 5,308,195 | A | * | 5/1994 | Hotek | 405/284 |
| 5,419,683 | A | | 5/1995 | Peace | 416/227 A |
| 5,437,519 | A | | 8/1995 | Bullivant | 405/239 |
| 5,505,033 | A | * | 4/1996 | Matsuo et al. | 52/296 |
| 5,586,417 | A | | 12/1996 | Henderson et al. | 52/295 |

(Continued)

FOREIGN PATENT DOCUMENTS

| DE | 1 045 735 | 12/1958 |
| DE | 100 09 072 | 8/2001 |
| DE | 102 26 996 | 4/2003 |
| DE | 10238033 A1 | 3/2004 |

(Continued)

*Primary Examiner* — Brian Glessner
*Assistant Examiner* — Joseph J Sadlon
(74) *Attorney, Agent, or Firm* — See IP Law Group PLLC

(57) ABSTRACT

An annular preform is constructed of predeterminable width and height and filled with a predeterminable quantity of a fluid grouting material. After setting of the grouting material and removal of the formwork a ring is placed on the surface of the set grouting material and a lower pylon segment is placed on the ring and connected thereto.

10 Claims, 3 Drawing Sheets

U.S. PATENT DOCUMENTS

| | | | | |
|---|---|---|---|---|
| 5,707,180 | A * | 1/1998 | Vickars et al. | 405/233 |
| 5,826,387 | A * | 10/1998 | Henderson et al. | 52/295 |
| 5,966,882 | A * | 10/1999 | Naito | 52/295 |
| 6,050,038 | A | 4/2000 | Fey et al. | 52/223.7 |
| 6,264,402 | B1 * | 7/2001 | Vickars et al. | 405/239 |
| 6,318,034 | B1 * | 11/2001 | Zavitz et al. | 52/194 |
| 6,470,645 | B1 | 10/2002 | Maliszewski et al. | 52/745.18 |
| 6,672,023 | B2 * | 1/2004 | Henderson | 52/296 |
| 6,705,058 | B1 * | 3/2004 | Foust et al. | 52/296 |
| 7,441,743 | B2 | 10/2008 | Behlinger et al. | 248/679 |
| 2002/0154952 | A1 * | 10/2002 | Gunter | 405/118 |
| 2003/0021636 | A1 | 1/2003 | Silber | 405/229 |
| 2003/0196393 | A1 | 10/2003 | Bowman et al. | 52/295 |
| 2004/0131428 | A1 | 7/2004 | Henderson | 405/233 |
| 2007/0006541 | A1 | 1/2007 | Seidel | 52/292 |
| 2008/0302038 | A1 | 12/2008 | Wobben | 52/296 |
| 2009/0068007 | A1 * | 3/2009 | Erickson et al. | 415/213.1 |

FOREIGN PATENT DOCUMENTS

| | | |
|---|---|---|
| DK | 174190 | 9/2001 |
| EP | 1 526 278 | 4/2005 |
| EP | 2 108 836 | 10/2009 |
| FR | 2692611 A1 | 12/1993 |
| GB | 606545 A | 8/1948 |
| GB | 2273310 A | 6/1994 |
| JP | 54-19504 | 2/1979 |
| JP | 55078722 A | 6/1980 |
| JP | 55-172440 | 12/1980 |
| JP | 8-209721 A | 8/1996 |
| JP | 08209721 A | 8/1996 |
| JP | 09158215 A | 6/1997 |
| JP | 10-121576 | 5/1998 |
| JP | 2003293938 A | 10/2003 |
| WO | 2004/057113 | 7/2004 |

* cited by examiner

METHOD FOR ERECTING A TOWER

BACKGROUND OF THE INVENTION

1. Field of the Invention

The present invention concerns a method of erecting a tower or pylon and a wind power installation with such a pylon.

2. Description of the Related Art

U.S. Pat. No. 5,826,387 discloses a foundation and a method of producing a foundation which can be used for example for wind power installations. U.S. Pat. No. 6,050,038 discloses a foundation system. DE 100 45 735 A1 discloses a means of fixing a column on a concrete foundation. DE 102 26 996 A1 discloses a method of producing a foundation, in particular for a pylon of a wind power installation.

It is known in the state of the art, when erecting a pylon in particular for a wind power installation, for a lower pylon segment to be placed on the connecting elements which project out of a foundation, with a base flange. That lower pylon segment is properly aligned (leveled) and fixed in the aligned position. In that case there is a gap between the base flange of the lower pylon segment and the top side of the foundation. That gap is filled with a grouting material which then has to set before it can be loaded and the pylon further constructed thereon. Setting can certainly take up to 24 hours.

A large crane is required for handling the lower pylon segment. That crane however is only further used for constructing the pylon after the grouting material has set. Shifting the crane for the period during which the gap grouting is setting is however too complicated and expensive and therefore does not happen. Accordingly the costly crane is stopped and inactive for 24 hours.

BRIEF SUMMARY OF THE INVENTION

Therefore the object of the invention is to efficiently carry out the structure of a pylon, in particular a pylon of a wind power installation.

That object is attained by a method of erecting a pylon as set forth in claim 1, a wind power installation with a pylon as set forth in claim 3, and a method of using a leveling ring for erecting a pylon as set forth in claim 6.

Therefore there is provided a method of erecting a pylon, in particular a pylon of a wind power installation, which has a foundation with segment anchors, wherein the connecting elements project beyond the top side of the foundation by a predetermined amount. An annular formwork is constructed of predeterminable width and height (step 30 of FIG. 4) and filled with a predeterminable amount of a fluid grouting material (step 32). After the grouting material has set and the formwork has been removed (step 34) a ring is placed on the surface of the set grouting material and a lower pylon segment is placed on the ring and connected thereto. In that case the ring may also be formed from a plurality of segments.

In that respect the invention is based on the realization that it is not leveling of the lower pylon section that is important, but the fact that it is exactly aligned in situ. That however can also be achieved using a leveling ring. Such a leveling ring is comparable to a flange ring which can be handled with a markedly lower level of effort and expenditure than the lower pylon section, for example with a vehicle-mounted crane. Also precise alignment (leveling) of the leveling ring is simpler than the corresponding procedure in relation to a pylon section. The fluid grouting material which is introduced into the formwork levels itself so that, after the grouting material has set, an exactly leveled surface is automatically available for receiving the ring. Naturally a pylon section can also be alternatively placed on the leveled surface. In that respect the thickness of the grouting material is material-dependent and is not to be less than a predetermined minimum thickness. It is preferably at least 2 mm but not more than 150 mm. In addition the leveling ring, when of greater width and/or thickness, can be made from a less high-grade material than the pylon flange. The pylon flange can also be reduced in its width. In that way it is possible to make better use of the transport width.

During the setting time however the (vehicle-mounted) crane can already be used for other tasks while the crane required for handling the pylon sections is not yet needed.

It is only when the grouting material has hardened and the ring has been placed in position that the large crane must be ready to erect the pylon, for example of a wind power installation, and can then relatively quickly erect the pylon segment by segment.

A particularly rational structure for the pylon can be implemented if prefabricated finished parts, in particular concrete finished parts, are used for the foundation. They are delivered ready for installation on the building site and connected to produce a foundation which can then be further used immediately and thus in such a way as to save time.

BRIEF DESCRIPTION OF THE SEVERAL VIEWS OF THE DRAWING(S)

The invention is described hereinafter with reference to the Figures.

DETAILED DESCRIPTION OF THE INVENTION

Figure 1:
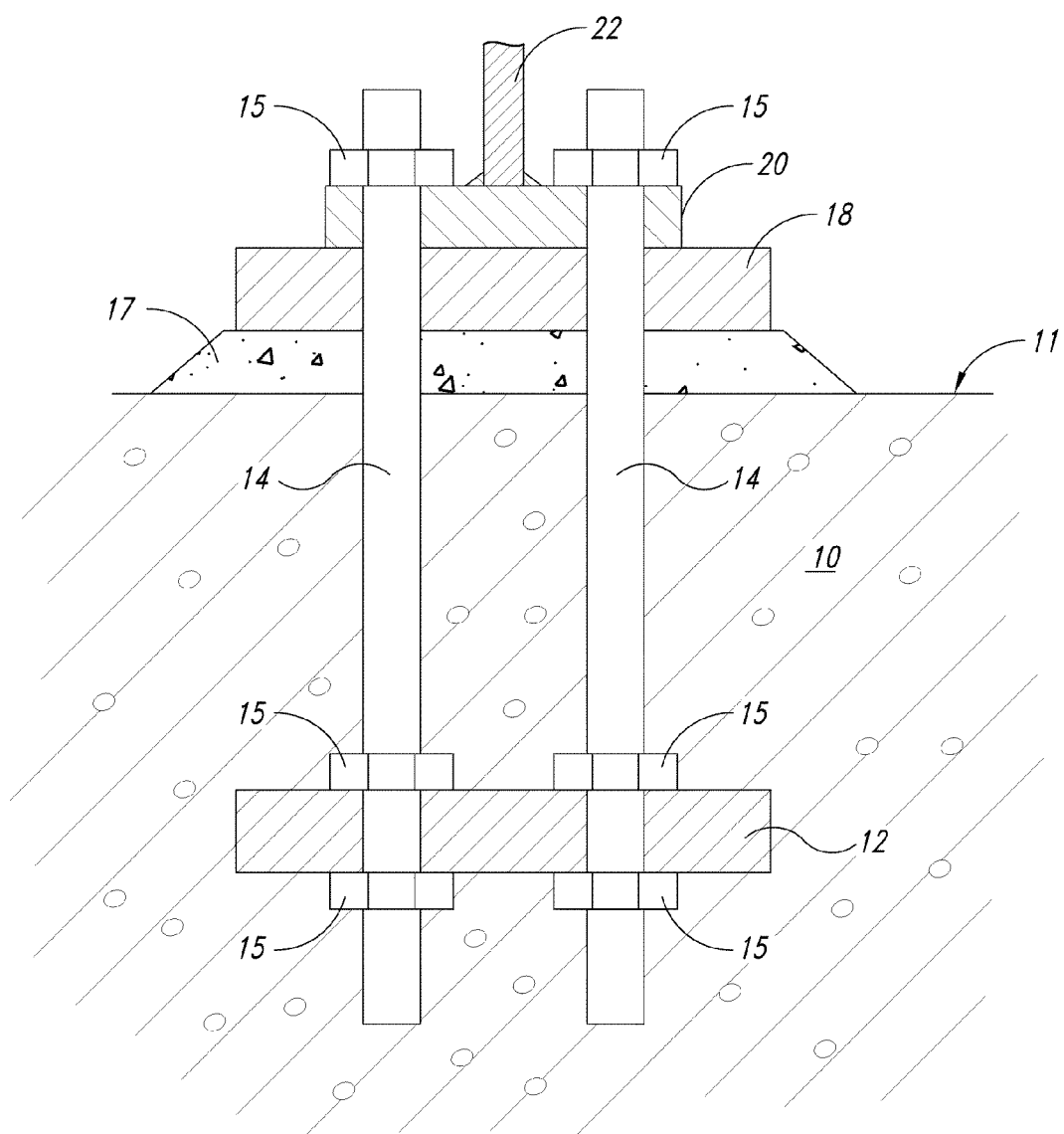
FIG. 1 is a diagrammatic view in section of a portion of a pylon base.

A foundation 10 can be in the form of a prefabricated finished part foundation but also in the form of an on-site mixed concrete foundation or a foundation made from supplied ready-mix concrete. One or more segment anchors 12 are provided in the foundation 10. Those segment anchors 12 can be adapted in shape and number to the particular demands of the foundation. Thus it is possible to use a segment anchor which for example is in one piece in relation to on-site mixed concrete foundations or foundations produced from ready-mix concrete, that segment anchor being woven into the reinforcement. In the case of prefabricated finished part foundations in contrast a plurality of segment anchors are used, which are adapted in respect of their shape to the finished part. It will be appreciated that a plurality of segment anchors can also be used in relation to an on-site mixed concrete structure or a structure produced from supplied ready-mix concrete.

Connecting elements 14 are connected to the segment anchor 12. The connecting elements 14 can be in the form of screwthreaded rods which are fixed with nuts 15 in a predetermined position to the segment anchor 12. The fixing elements 14 extend a predetermined distance outside the foundation 10 above the top side 11 of the foundation. Instead of a screw connection it is also possible to use a welded connection.

Figure 4:
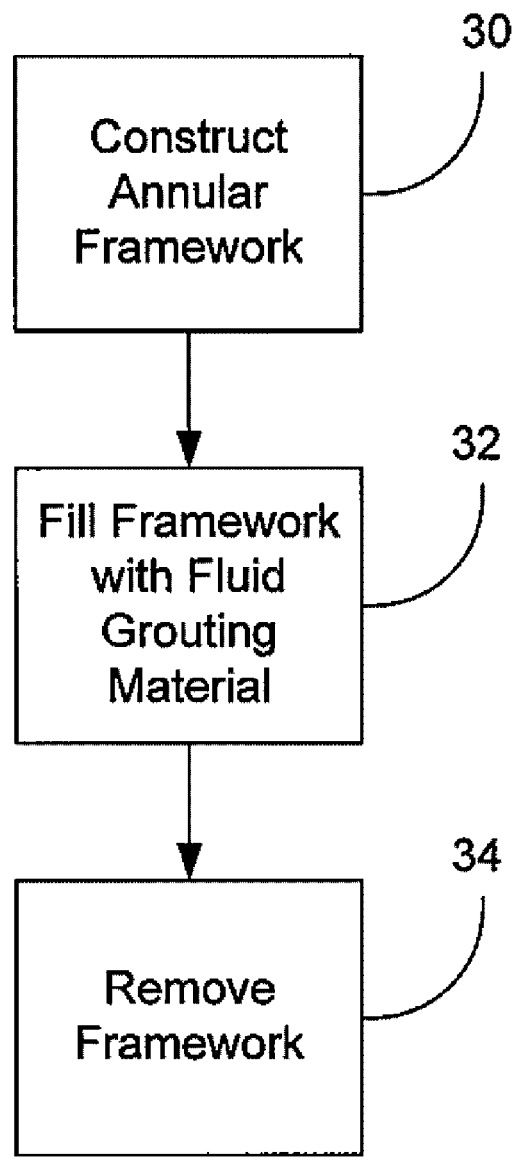
FIG. 4 is a flowchart of a method of using a formwork.

An annular formwork is constructed, of predeterminable width and height (step 30 of FIG. 4, and filled with a predetermined amount of a fluid grouting material (step 32).

After that grouting material 17 has set or hardened, a leveling ring 18 which is formed in one piece or a plurality of pieces is arranged on the grouting material, wherein the leveling ring 18 is exactly leveled so that it forms a perfectly aligned base for the pylon and a lower pylon segment with a lower flange ring 20 and an illustrated pylon wall plate 22 can be placed on the leveling ring 18. The screwthreaded rods 14 engage through suitably positioned holes in the leveling ring 18 and in the lower flange ring 20 of the lower pylon section and nuts 15 are fitted thereon in order to connect the lower pylon section fixedly to the foundation 10 by way of the leveling ring 18.

Figure 2A:
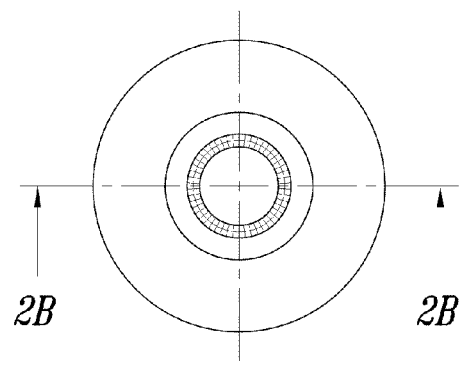
FIG. 2A shows a plan view of a pylon base.
Figure 2C:
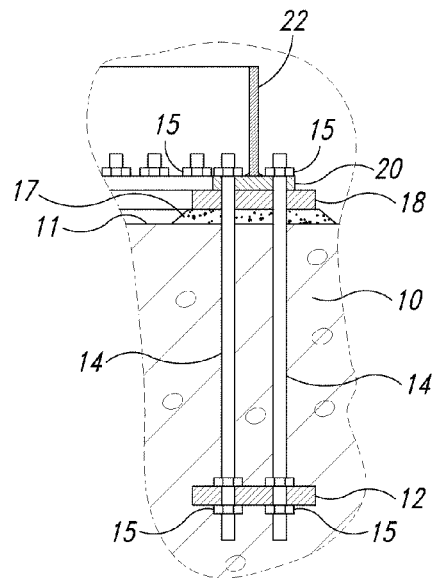
FIG. 2C shows a view on an enlarged scale of a portion of the pylon base of FIG. 2B.
Figure 2B:
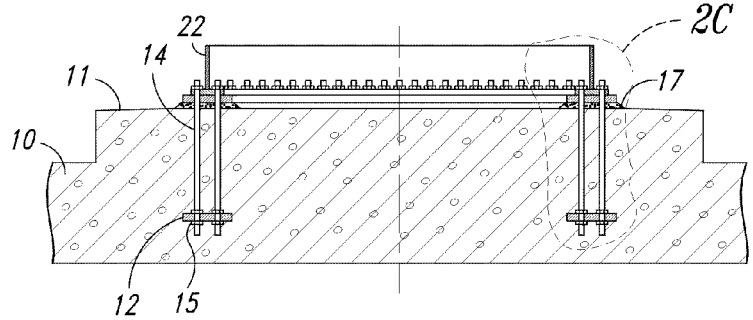
FIG. 2B shows a view in section taken along line 2B-2B of the pylon base of FIG. 2A.

FIG. 2A shows a plan view of a pylon base. FIG. 2B shows a cross-section taken along line 2B-2B in FIG. 2A. As in FIG. 1, shown here is a foundation 10 with a foundation surface 11. In particular two segment anchors 12 and four screwthreaded rods 14 are shown. A portion of the pylon base is shown on an enlarged scale in FIG. 2C. That view substantially corresponds to the view in FIG. 1.

Figure 3:
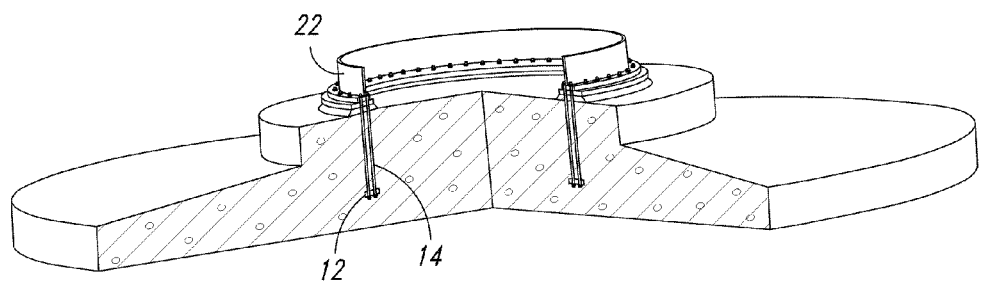
FIG. 3 shows a perspective view of a pylon base.

FIG. 3 shows a perspective view of the pylon base with a portion thereof cut open. Leveling of the pylon base is effected as described with reference to FIG. 1.

As the pylon for example of a wind power installation can now be constructed in one go a crane only has to be provided once for speedy pylon erection, but until then the crane can perform other tasks.

Logistical tasks are also simplified. Hitherto the lower pylon section had to be on site at least 24 hours before the other parts of the pylon in order to be able to satisfactorily install it. It will be appreciated that the other parts of the pylon could also be supplied at the same time. They however could not be constructed at the same time and therefore took up additional space on the building site, for the waiting time.

The method according to the invention means that the pylon segments can be delivered in a transport process to the erection point just in time. That also eliminates additional transloading procedures, more specifically firstly from the transport vehicle to intermediate storage on the ground and then later from there to the location of installation. Rather pylon segments which are delivered just in time can be unloaded from the transport vehicle and fitted in place immediately.

With the above-described solution care is to be taken to ensure that the grouting material must always be applied with at least a minimum thickness, which is dependent on the material used for the grout, because that grouting material is required to transmit the forces from the pylon to the foundation. If the grouting material is applied too thinly, that layer can fracture and give rise to considerable damage.

The above-described solution has been found to be advantageous in terms of efficiently carrying out rationalizing the erection of a pylon, in particular a pylon of a wind power installation. On the other hand the costs and material properties also play a not insignificant part. It should be pointed out that the lowermost flange of a pylon segment must be made from a very high-grade material in order to be able to carry the loads originating from the pylon. If a pylon of that kind is set up on a concrete foundation then the concrete is the weaker one of the two aspects of the connection. Accordingly the pylon flange must be broader in width so that the concrete of the foundation is not overloaded. Consequently the flange in the lower pylon segment must be of a width which is oversized in relation to the steel which is used in that respect. That is to be considered as a disadvantage in particular in terms of the costs of the steel used in that respect.

By virtue of the insertion of the leveling ring it is now possible in accordance with the invention to insert a kind of transitional step between the highly loadable but cost-intensive steel of the lower pylon segment and the lower loadable concrete of the foundation. Thus the leveling ring can be of a sufficient width to transmit the loads of the wind power installation into the foundation without risk. On the other hand it is possible to use better or cheaper steel at that location and thus the flange on the lower pylon segment can be made correspondingly narrower and thus less expensively in terms of material and cost.

A further advantage is enjoyed when the leveling ring is made in the form of segments and can thus be stacked and transported in segment-wise manner. If the leveling ring is of a large diameter, that is not a problem in accordance with the invention from the point of view of transportation because it can be stacked in segment-wise manner. The lower pylon segment has a narrower base flange of a smaller width as now the base flange can be material-specifically sized. The transport width can thus also be correspondingly reduced.

Erection for example of a pylon of a wind power installation on land was described in the example set forth hereinbefore. Erecting a pylon of a wind power installation off-shore, that is to say in the water or in the sea, can also be effected by means of the above-described leveling ring and a corresponding leveling procedure before a lower pylon segment is mounted in place.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method of erecting a pylon of a wind power installation, comprising:
    forming a foundation with segment anchors, wherein continuous connecting elements are coupled to the segment anchors and project beyond a top side of the foundation by a predetermined amount;
    constructing an annular formwork of predeterminable width and height on the top side of the foundation;
    filling the formwork with a predeterminable amount of a fluid grouting material that levels itself;
    allowing the grouting material to set such that a leveled surface is automatically available;
    removing the formwork;
    placing a ring, having a plurality of first holes for receiving the connecting elements which project beyond the top side of the foundation, on the leveled surface of the grouting material which has set; and
    connecting a lower pylon segment, having a plurality of second holes for receiving the connecting elements, on the ring via the connecting elements.

2. A method according to claim 1 wherein forming a foundation includes forming a foundation using concrete finished parts.

3. A wind power installation, comprising:
a pylon which has at least a lower pylon segment, the lower pylon segment including a lower flange ring having a plurality of holes;
a foundation with embedded segment anchors;
a ring of grouting material made from a fluid grouting material which has set, the ring of grouting material positioned on a top side of the foundation;
continuous connecting elements which are coupled to the segment anchors and project a predetermined distance above the top side of the foundation; and
a leveling ring which has a plurality of holes for receiving the connecting elements and is arranged on the ring of grouting material which has set, and wherein the lower pylon segment is positioned on the leveling ring such that the lower flange ring receives the connecting elements through the plurality of holes of the lower flange ring.

4. A wind power installation according to claim 3 wherein the connecting elements are screw-threaded rods, and wherein the wind power installation further comprises nuts respectively fitted on the screw-threaded rods to secure the lower pylon segment to the foundation.

5. A wind power installation according to claim 3 wherein the foundation has concrete finished parts.

6. A method of erecting a pylon of a wind power installation, comprising:
providing a foundation having connecting elements that project beyond a top side of the foundation;
constructing a formwork on the top side of the foundation;
placing fluid grouting material in the formwork and allowing the grouting material to set into a set ring of grouting material;
after allowing the grouting material to set into a set ring, placing a leveling ring on the set ring of grouting material;
placing a lower pylon segment with a lower flange ring on the leveling ring; and
connecting the lower flange ring of the lower pylon segment to the foundation via the leveling ring and set ring of grouting material.

7. The method according to claim 6 wherein the connecting elements are screw-threaded rods, the method further comprising fitting nuts respectively on the screw-threaded rods.

8. The method according to claim 6, wherein:
the leveling ring has a plurality of first holes for receiving the connecting elements;
the lower flange ring includes a plurality of second holes for receiving the connecting elements, and
the connecting includes connecting the lower flange ring of the lower pylon segment to the foundation via the leveling ring and the set ring of grouting material using the connecting elements.

9. The method according to claim 1 wherein the connecting elements are screw-threaded rods, the method further comprising fitting nuts respectively on the screw-threaded rods.

10. The wind power installation of claim 3, wherein the leveling ring is positioned on a top surface of the ring of grouting material which has set to form a leveled surface.

* * * * *